(12) United States Patent
Zhang et al.

(10) Patent No.: US 11,244,177 B2
(45) Date of Patent: Feb. 8, 2022

(54) METHODS AND SYSTEMS FOR ROADWORK ZONE IDENTIFICATION

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 113 days.

(21) Appl. No.: 16/217,952

(22) Filed: Dec. 12, 2018

(65) Prior Publication Data
US 2020/0193194 A1    Jun. 18, 2020

(51) Int. Cl.
| | | |
|---|---|---|
| G06K 9/00 | (2006.01) | |
| G06K 9/62 | (2006.01) | |
| B60W 50/00 | (2006.01) | |
| B60W 30/08 | (2012.01) | |

(52) U.S. Cl.
CPC ......... *G06K 9/00818* (2013.01); *B60W 30/08* (2013.01); *B60W 50/0098* (2013.01); *G06K 9/6262* (2013.01)

(58) Field of Classification Search
CPC . G06K 9/00818; G06K 9/6262; B60W 30/08; B60W 50/0098
See application file for complete search history.

(56) References Cited

U.S. PATENT DOCUMENTS

| | | |
|---|---|---|
| 8,704,676 B2 | 4/2014 | Hawkes et al. |
| 8,996,269 B2 | 3/2015 | Ham |
| 9,195,914 B2 | 11/2015 | Fairfield et al. |
| 2014/0063232 A1* | 3/2014 | Fairfield ................... B60T 7/18 348/118 |
| 2014/0114563 A1 | 4/2014 | Newson et al. |

(Continued)

FOREIGN PATENT DOCUMENTS

| | | |
|---|---|---|
| DE | 102013009856 A1 | 12/2014 |
| DE | 102016202973 B4 | 8/2017 |
| KR | 20150049529 A | 5/2015 |

OTHER PUBLICATIONS

Piccioli et al., "Robust Method for Road Sign Detection and Recognition", Image and Vision Computing 14 (1996) pp. 209-223.

(Continued)

*Primary Examiner* — Yuwen Pan
*Assistant Examiner* — Umair Ahsan
(74) *Attorney, Agent, or Firm* — Ditthavong, Steiner & Mlotkowski

(57) ABSTRACT

A method, a system, and a computer program product may be provided for generating at least one route speed funnel for roadwork zone identification. The method may include generating a plurality of learned road signs from a plurality of road sign observations captured by a plurality of vehicles, determining a plurality of primary speed funnels, and generating at least one route speed funnel from the plurality of primary speed funnels based on a route validity condition. Each of the plurality of primary speed funnels comprises a different pair of learned road signs selected from the generated plurality of learned road signs. The method may further include determining a plurality of candidate speed funnels and temporally validating the plurality of candidate speed funnels to obtain the plurality of primary speed funnels.

20 Claims, 11 Drawing Sheets

TRAVEL DIRECTION

ROAD WORK ZONE START

(56) References Cited

U.S. PATENT DOCUMENTS

| | | | |
|---|---|---|---|
| 2015/0266472 A1* | 9/2015 | Ferguson | G08G 1/166 |
| | | | 701/23 |
| 2017/0008521 A1* | 1/2017 | Braunstein | G01C 21/3407 |
| 2018/0025628 A1* | 1/2018 | Ivanov | G08G 1/052 |
| | | | 701/117 |
| 2018/0134286 A1 | 5/2018 | Yi et al. | |
| 2018/0189601 A1* | 7/2018 | Dabeer | G01C 21/3602 |
| 2018/0227853 A1* | 8/2018 | Kench | H04W 4/027 |

OTHER PUBLICATIONS

Riffkin et al., "Variable Speed Limit Signs Effects on Speed and Speed Variation in Work Zones", Report No. UT-08.01, Jan. 2008, 48 pages.

* cited by examiner

| HOUR OF DAY | COUNT OF ROAD SIGN OBSERVATIONS IN 50 KM/HR | COUNT OF ROAD SIGN OBSERVATIONS IN 40 KM/HR |
|---|---|---|
| 1:00 | 23 | 0 |
| 2:00 | 12 | 0 |
| 3:00 | 11 | 34 |
| 4:00 | 0 | 22 |
| 6:00 | 23 | 12 |
| 7:00 | 12 | 2 |
| 11:00 | 11 | 0 |

FIG. 8A

| HOUR OF THE DAY | COUNT OF ROAD SIGN OBSERVATIONS IN 50 KM/HR | COUNT OF ROAD SIGN OBSERVATIONS IN 30 KM/HR |
|---|---|---|
| 10:00 | 44 | 12 |
| 11:00 | 12 | 24 |
| 12:00 | 15 | 12 |
| 13:00 | 0 | 0 |
| 14:00 | 1 | 0 |
| 15:00 | 2 | 2 |
| 16:00 | 0 | 3 |

FIG. 8B

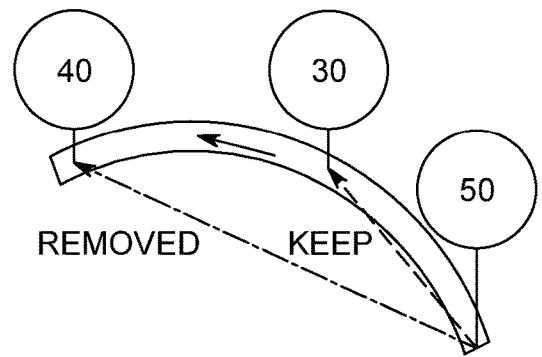
FIG. 10A
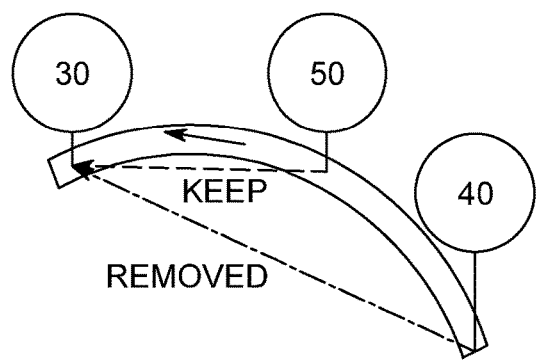
FIG. 10B
BEFORE SIGN COMBINE
| SEQUENCE | START SIGN | END SIGN |
|---|---|---|
| 1 | 90 | 70 |
| 2 | 70 | 50 |
| 3 | 20 | 10 |
| 4 | 50 | 30 |
| ...... | ...... | ...... |
AFTER SIGN COMBINE
| FUNNEL ID | SIGN 1 | SIGN 2 | SIGN 3 | SIGN 4 |
|---|---|---|---|---|
| F1 | 90 | 70 | 50 | 30 |
| F2 | 20 | 10 | / | / |
| ...... | ...... | ...... | ...... | ...... |
FIG. 10C

METHODS AND SYSTEMS FOR ROADWORK ZONE IDENTIFICATION

TECHNOLOGICAL FIELD

The present disclosure generally relates to identification of roadwork zones in a geographical region, and more particularly relates to generating at least one route speed funnel for roadwork zone identification.

BACKGROUND

Road works or roadwork zones are typically found on a section of a road or an entire road that is occupied for the purpose of, for example, road surface repairs, work on power lines, water works, etc. Roadwork zones may also be found when a major accident occurs and road debris from the accident needs to be cleared. Such roadwork zones are indicated to users of vehicles or autonomous vehicles using road signs, such as, "men at work" sign, "roadwork ahead" sign etc., or temporary signs such as traffic cones, barrier boards, etc. In some countries, the roadwork zones are indicated to the users of vehicles or autonomous vehicles using lane markings from a distance of the roadwork zone and speed limit signs from a distance of the roadwork zone. A user of the vehicle may identify the roadwork zones using such road signs at low speeds but it might not be possible to identify those signs at higher speeds. Moreover, for autonomous vehicles identifying such signs well in advance is of utmost importance to avoid collisions and undue mishaps.

BRIEF SUMMARY

Detection of roadwork zones is essential for navigation of autonomous vehicles and providing environmental awareness for vehicle safety has been a primary concern for automobile manufacturers and related service providers. In vehicles, such as, autonomous vehicles, a plurality of sensors are installed to capture the road signs indicating the roadwork zones. However, with current sensors installed in the autonomous vehicles, the autonomous vehicles may not be capable to detect road signs such as a "men at work" sign. In order to identify roadwork zones, the autonomous vehicles may detect speed limit signs that are in close vicinity or along a driving path of the roadwork zone. The vehicles are capable of reporting individual speed limit observations on detecting speed limit signs. Typically, sign values of the speed limit signs indicate a decrease towards the roadwork zone replicating a funnel. Therefore, the speed limit signs with the reducing sign values are referred to as a speed funnel. However, a speed funnel may not necessarily identify a roadwork zone. Many a times, a speed funnel may indicate a transition from a highway to ramps. It would be advantageous to detect a speed funnel only on a route towards a destination of the user for identifying roadwork zones en route to the destination. Accordingly, there is a need for identifying a roadwork zone for autonomous vehicles and semi-autonomous vehicles to make a smooth transition from an autonomous mode to a manual mode when approaching a roadwork zone.

A method, a system, and a computer program product are provided in accordance with an example embodiment described herein for generating at least one route speed funnel for roadwork zone identification. Embodiments disclosed herein may provide a method for generating at least one route speed funnel for roadwork zone identification. The method includes: generating, by a processor, a plurality of learned road signs from a plurality of road sign observations captured by a plurality of vehicles, determining a plurality of primary speed funnels, and generating at least one route speed funnel from the plurality of primary speed funnels based on a route validity condition. Each of the plurality of primary speed funnels may include a different pair of learned road signs selected from the generated plurality of learned road signs. The route validity condition may be based on one or more links between the different pair of learned road signs of each of the plurality of primary speed funnels. Generating the plurality of learned road signs from the plurality of road sign observations may further include processing the plurality of road sign observations based on location data of the plurality of road sign observations. The generated plurality of learned road signs is associated with corresponding locations, corresponding headings, corresponding road sign values, and corresponding road sign types. Determining the plurality of primary speed funnels may further include: determining a plurality of candidate speed funnels, based on the corresponding locations, the corresponding headings, the corresponding road sign values, and the corresponding road sign types of the plurality of learned road signs and determining the plurality of primary speed funnels by temporally validating the determined plurality of candidate speed funnels based on a correlation of corresponding timestamps of the plurality of road sign observations associated with the different pair of learned road signs in each of the determined plurality of candidate speed funnels. Each of the plurality of candidate speed funnels includes a different pair of learned road signs selected from the generated plurality of learned road signs.

Determining the plurality of candidate speed funnels may further include: calculating a plurality of distances between the corresponding locations of learned road signs of each pair of learned road signs in the generated plurality of learned road signs, filtering the generated plurality of learned road signs based on the calculated plurality of distances lying within a threshold distance range, to obtain a plurality of distance filtered learned road signs, and determining a plurality of heading filtered learned road signs from the plurality of distance filtered learned road signs based on a heading difference between each pair of the plurality of distance filtered learned road signs lying within a threshold heading range. Determining plurality of candidate speed funnels may further include: obtaining a plurality of sight filtered learned road signs by filtering the plurality of heading filtered learned road signs based on a heading of sight difference between each pair of the plurality of heading filtered learned road signs lying within a threshold sight range, filtering the plurality of sight filtered learned road signs based on a difference in the corresponding road sign values of each pair of the plurality of sight filtered learned road signs lying within a threshold value range, to obtain a plurality of value filtered learned road signs, filtering a plurality of pairs of value filtered learned road signs from the plurality of value filtered learned road signs based on the corresponding locations of value filtered learned road signs in each pair of the plurality of value filtered learned road signs, and determining the plurality of candidate speed funnels based on the filtered plurality of pairs of value filtered learned road signs.

The route validity condition includes a total length of one or more links lying within a threshold length and a heading difference between one or more links lying within a threshold heading range. In an example embodiment, the generated at least one route speed funnel may include two or more route speed funnels and at least two route speed funnels of the two or more route speed funnels may have a common learned road sign. In the example embodiment, the method may further include merging the at least two route speed funnels of the two or more route speed funnels based on a position of the common learned road sign in each of the at least two route speed funnels of the two or more route speed funnels.

In an example embodiment, a system for generating at least one route speed funnel for roadwork zone identification is provided. The system may include at least one non-transitory memory configured to store computer program code instructions, and at least one processor configured to execute the computer program code instructions to at least: generate a plurality of learned road signs from a plurality of road sign observations captured by a plurality of vehicles, determine a plurality of primary speed funnels, and generate at least one route speed funnel from the plurality of primary speed funnels based on a route validity condition, wherein the route validity condition is based on one or more links between the different pair of learned road signs of each of the plurality of primary speed funnels. Each of the plurality of primary speed funnels may include a different pair of learned road signs selected from the generated plurality of learned road signs. The processor may be further configured to process the plurality of road sign observations based on location data of the plurality of road sign observations to generate the plurality of learned road signs. The processor may be further configured to: determine a plurality of candidate speed funnels, based on corresponding locations, corresponding headings, corresponding road sign values, and corresponding road sign types of the plurality of learned road signs and determine the plurality of primary speed funnels by temporally validating the determined plurality of candidate speed funnels based on a correlation of corresponding timestamps of the plurality of road sign observations associated with the different pair of learned road signs in each of the determined plurality of candidate speed funnels. The processor may be further configured to: calculate a plurality of distances between the corresponding locations of learned road signs of each pair of learned road signs in the generated plurality of learned road signs, filter the generated plurality of learned road signs based on the calculated plurality of distances lying within a threshold distance range, to obtain a plurality of distance filtered learned road signs, and determine a plurality of heading filtered learned road signs from the plurality of distance filtered learned road signs based on a heading difference between each pair of the plurality of distance filtered learned road signs lying within a threshold heading range. The processor may be further configured to: obtain a plurality of sight filtered learned road signs by filtering the plurality of heading filtered learned road signs based on a heading of sight difference between each pair of the plurality of heading filtered learned road signs lying within a threshold sight range, filter the plurality of sight filtered learned road signs based on a difference in the corresponding road sign values of each pair of the plurality of sight filtered learned road signs lying within a threshold value range, to obtain a plurality of value filtered learned road signs, filter a plurality of pairs of value filtered learned road signs from the plurality of value filtered learned road signs based on the corresponding locations of value filtered learned road signs in each pair of the plurality of value filtered learned road signs; and determine the plurality of candidate speed funnels based on the filtered plurality of pairs of value filtered learned road signs. In some example embodiments, the processor may be further configured to merge at least two route speed funnels of two or more route speed funnels based on a position of the common learned road sign in each of the at least two route speed funnels of the two or more route speed funnels, where the generated at least one route speed funnel comprises the two or more route speed funnels, and where the at least two route speed funnels of the two or more route speed funnels have a common learned road sign.

Embodiments of the present invention may provide a computer program product including at least one non-transitory computer-readable storage medium having computer-executable program code instructions stored therein. The computer-executable program code instructions when executed by a computer, cause the computer to carry out operations for generating at least one route speed funnel for roadwork zone identification, the operations including: generating, by a processor, a plurality of learned road signs from a plurality of road sign observations captured by a plurality of vehicles, determining a plurality of primary speed funnels, and generating at least one route speed funnel from the plurality of primary speed funnels based on a route validity condition, where the route validity condition is based on one or more links between the different pair of learned road signs of each of the plurality of primary speed funnels. The route validity condition may include a total length of one or more links lying within a threshold length and a heading difference between one or more links lying within a threshold heading range.

BRIEF DESCRIPTION OF THE DRAWINGS

Figure 1:
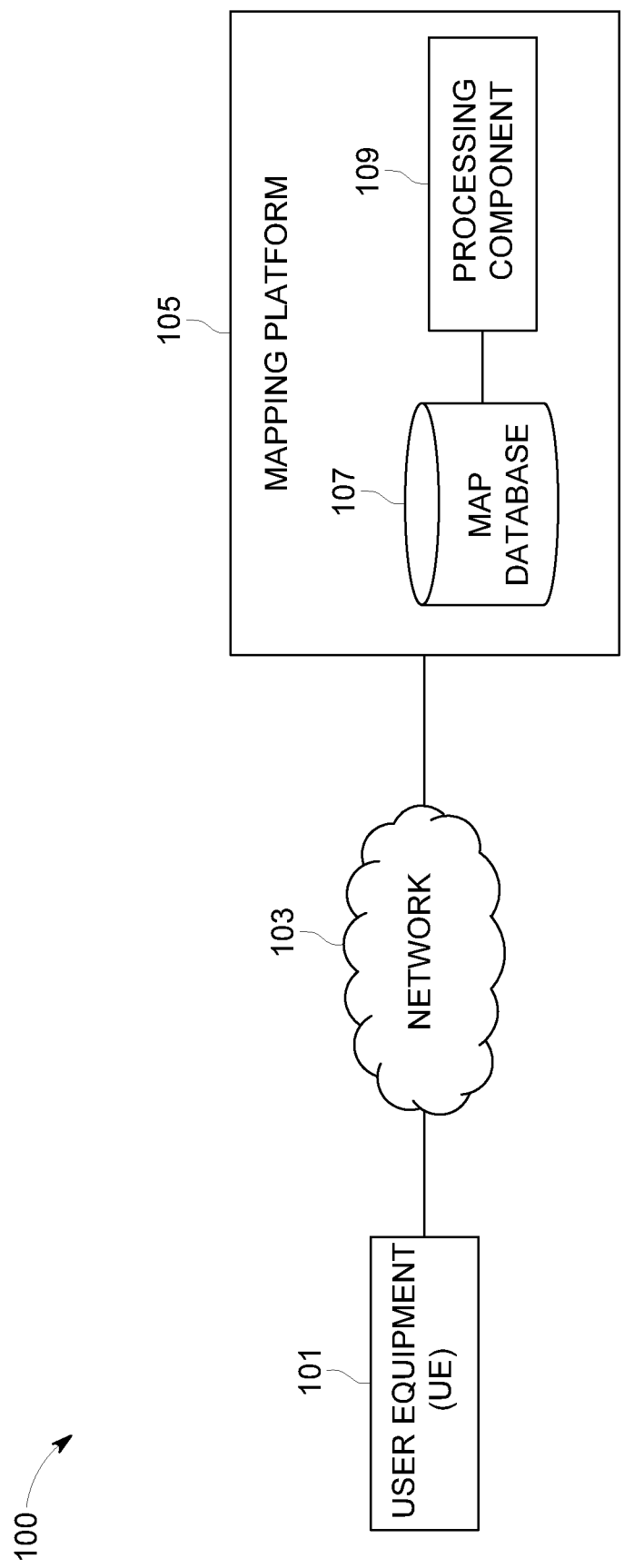
Figure 2:
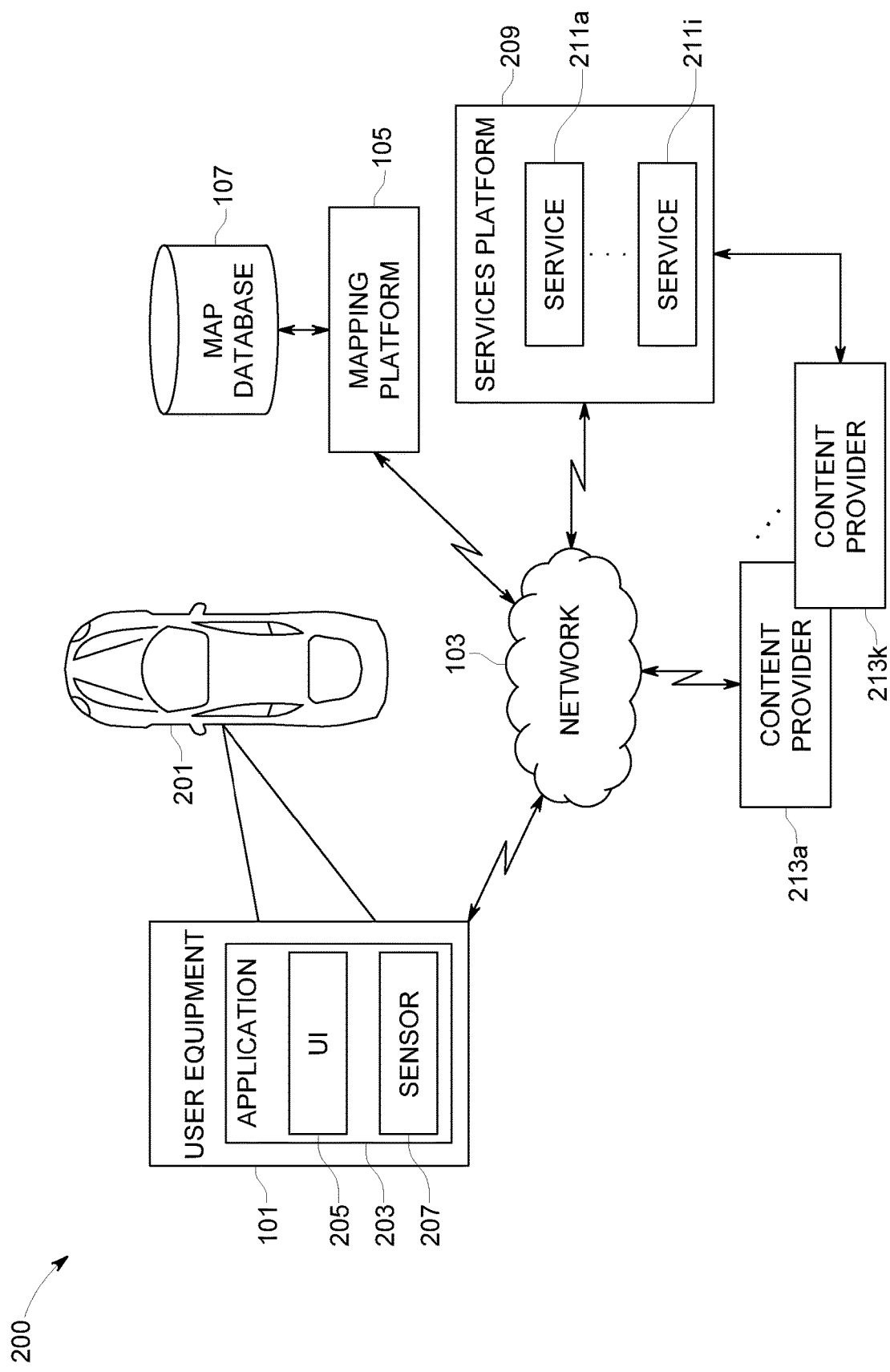
Figure 3:
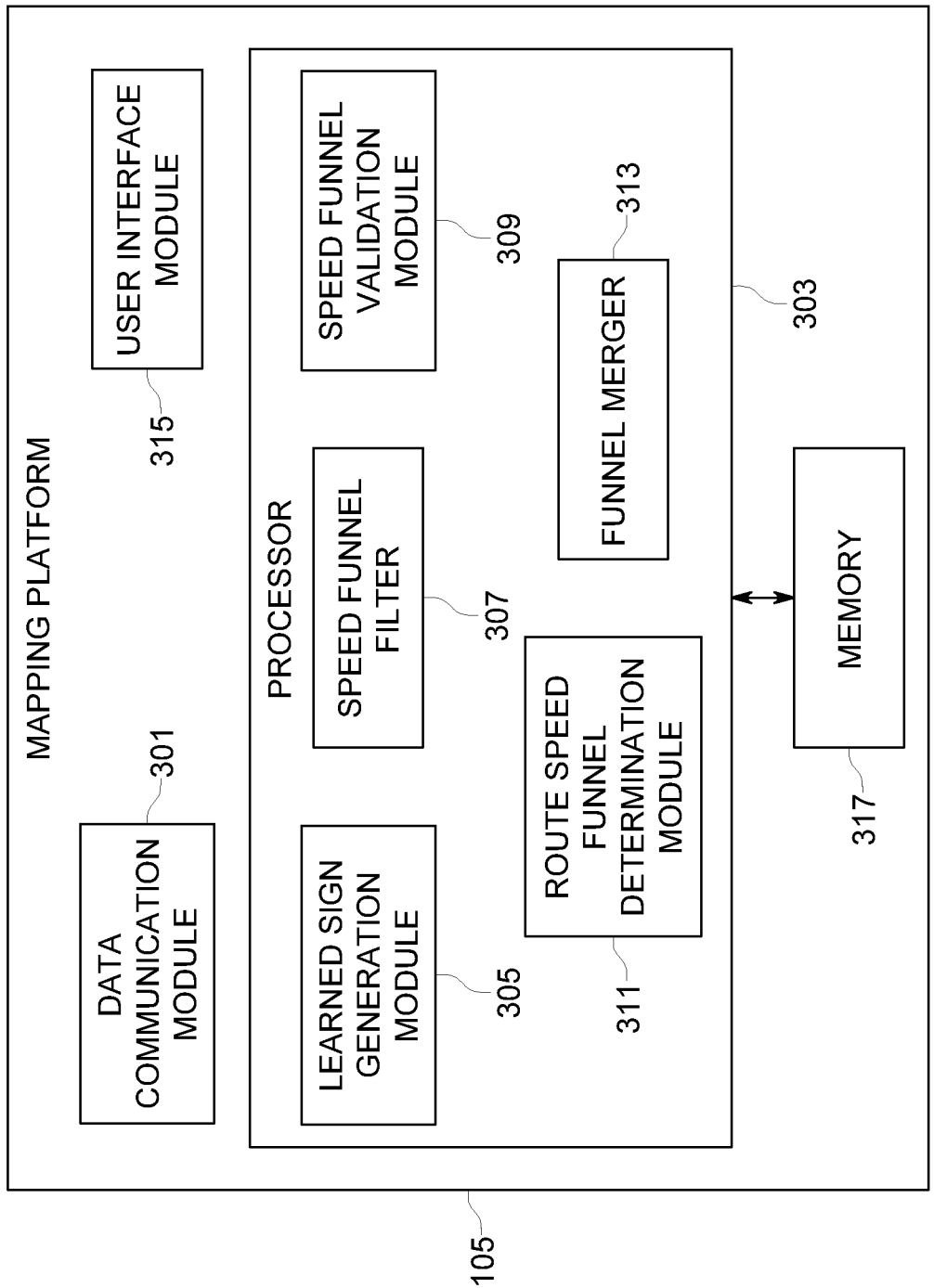
Figure 4:
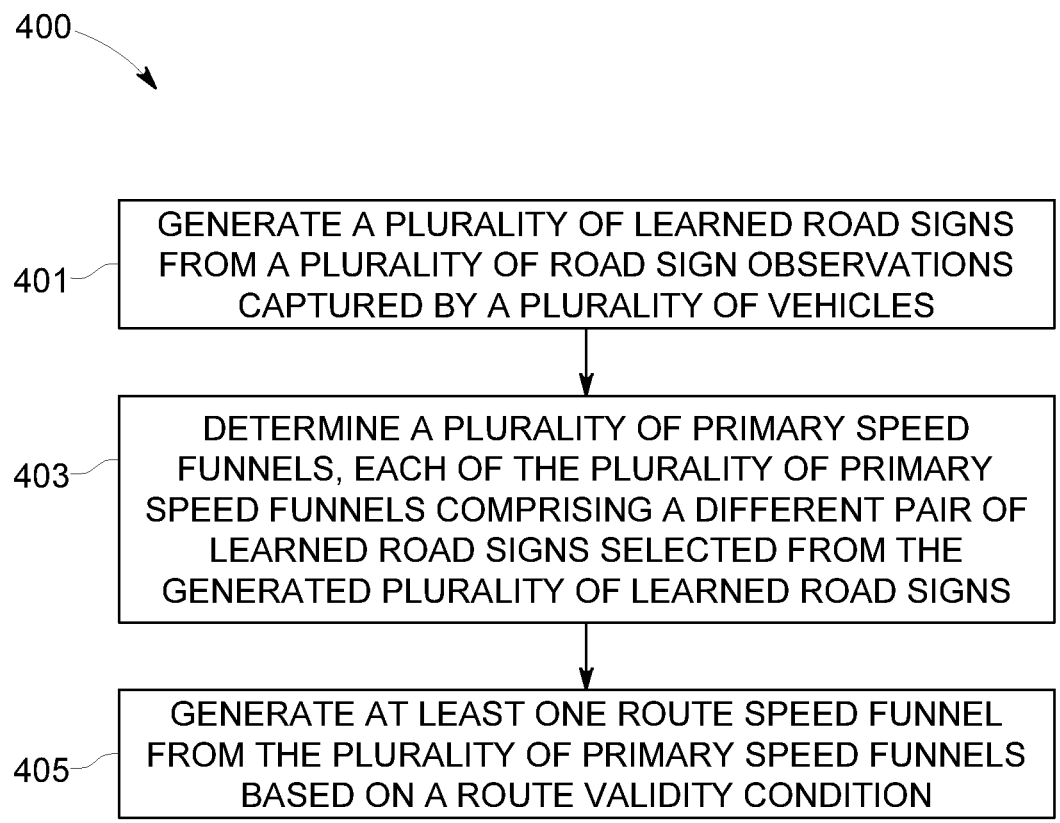
Figure 5:
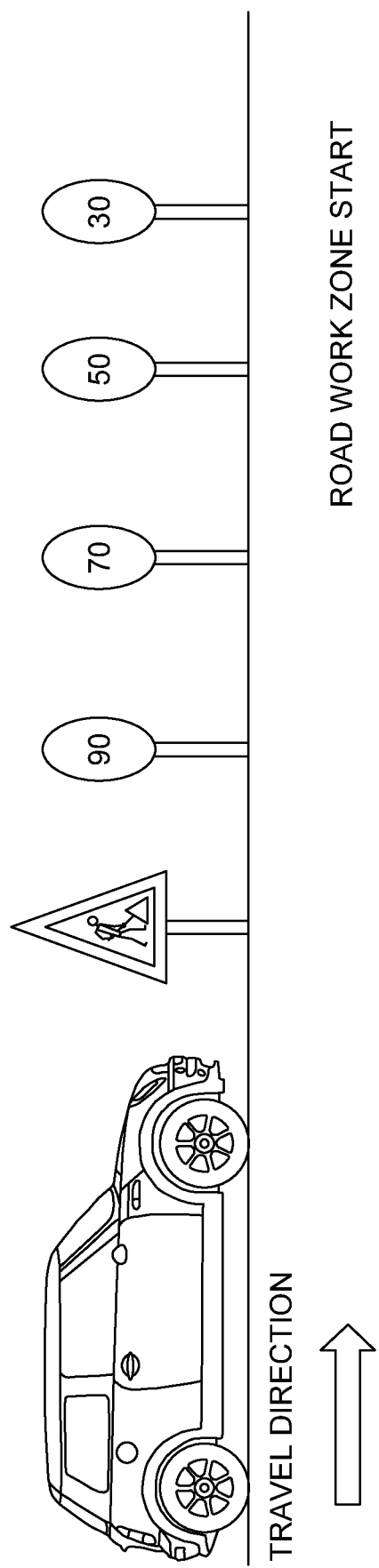
Figure 6A:
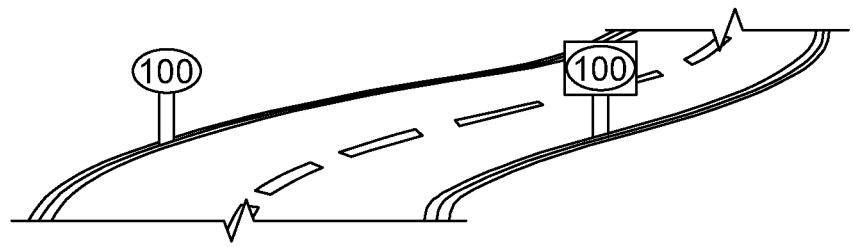
Figure 6B:
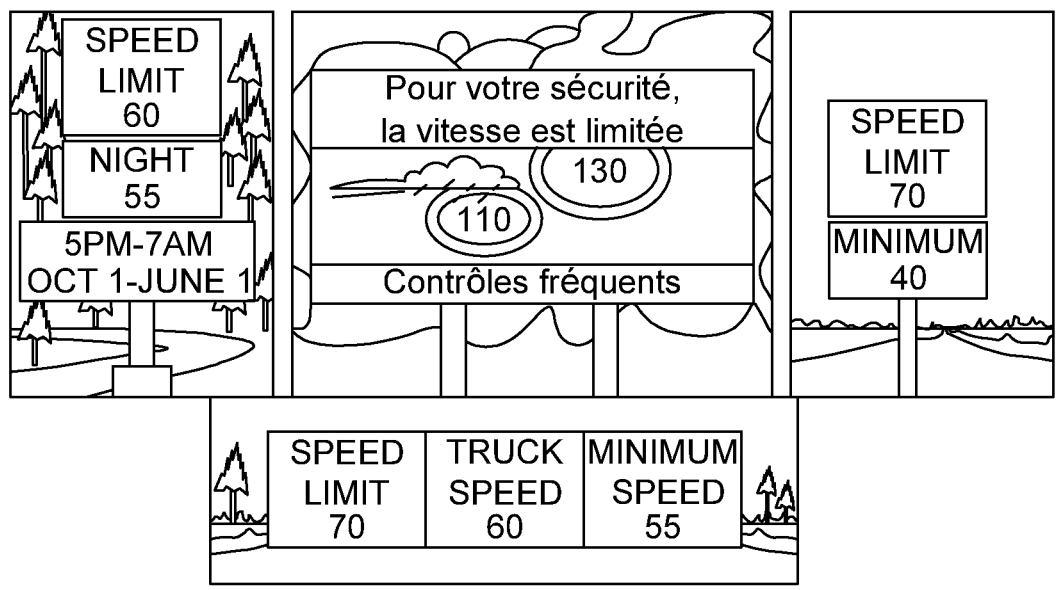
Figure 7:
Figure 7:
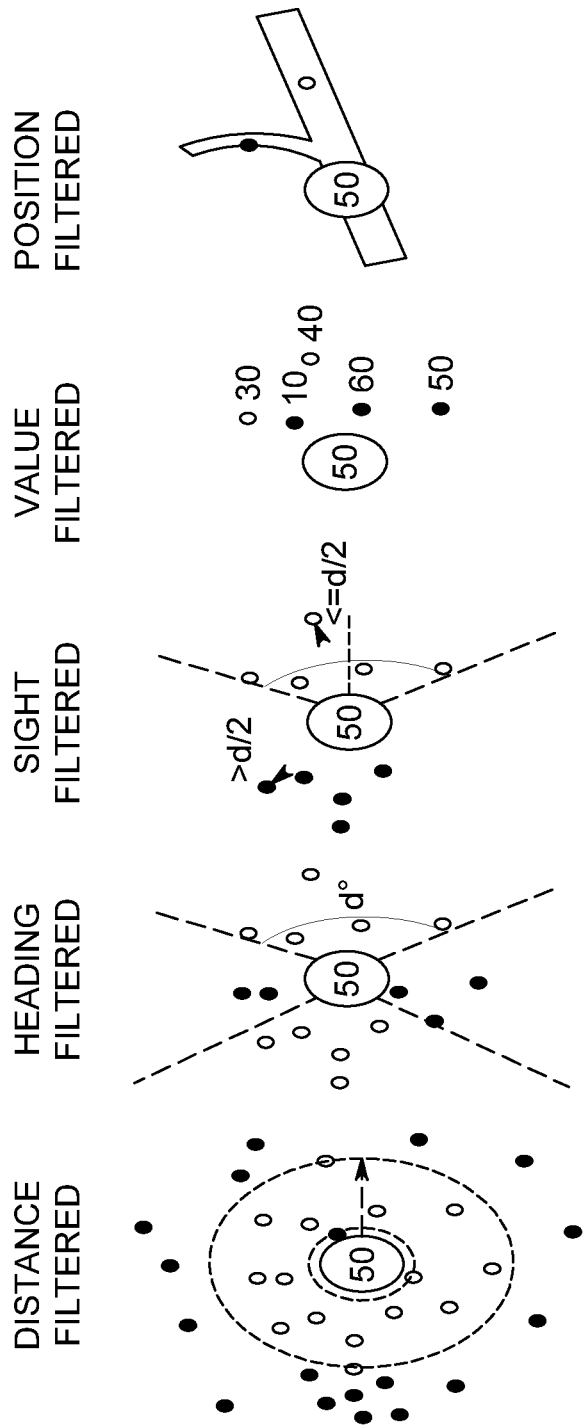
Figure 9A:
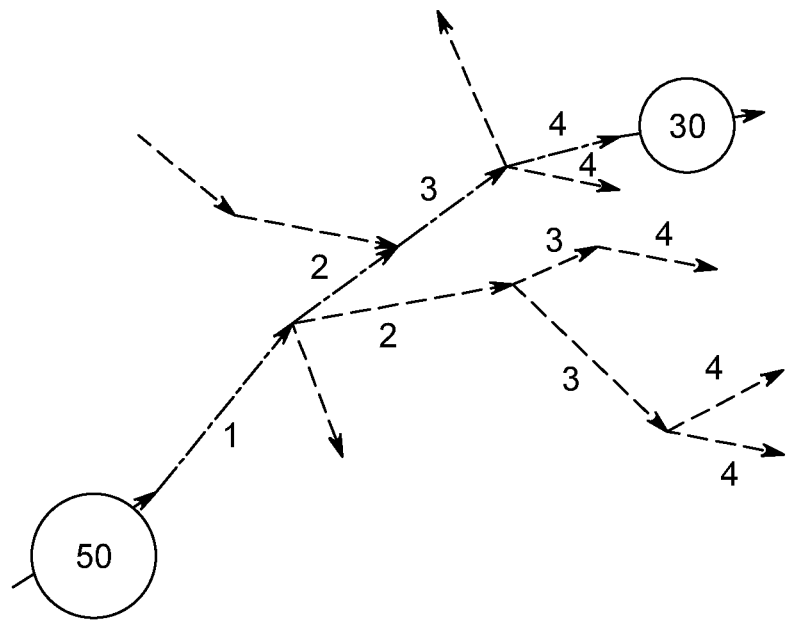
Figure 9B:
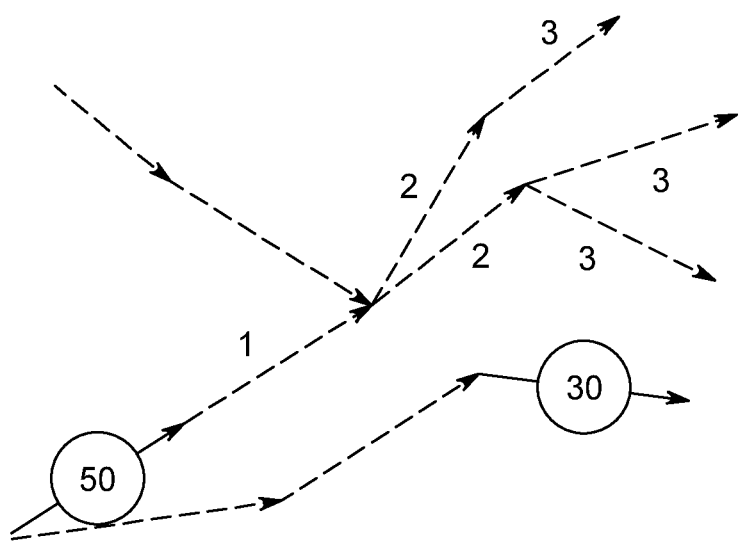

Having thus described example embodiments of the invention in general terms, reference will now be made to the accompanying drawings, which are not necessarily drawn to scale, and wherein:

FIG. 1 illustrates a schematic diagram of a system for generating at least one route speed funnel for roadwork zone identification, in accordance with an example embodiment;

FIG. 2 illustrates a block diagram of one embodiment of a system for generating at least one route speed funnel for roadwork zone identification, in accordance with an example embodiment;

FIG. 3 illustrates a block diagram of a mapping platform exemplarily illustrated in FIG. 2 that may be used to generate at least one route speed funnel for roadwork zone identification, in accordance with an example embodiment;

FIG. 4 illustrates a method for generating at least one route speed funnel for roadwork zone identification, in accordance with an example embodiment;

FIG. 5 illustrates a schematic diagram showing a speed funnel indicating a start of a roadwork zone, in accordance with an example embodiment;

FIGS. 6A-6B illustrate schematic diagrams showing positioning of road signs, in accordance with an example embodiment;

FIG. 7 illustrates a schematic diagram comprising steps for determining a plurality of candidate speed funnels from a plurality of learned road signs, in accordance with an example embodiment;

FIGS. 8A-8B illustrate tabular representations showing determining a primary speed funnel from the plurality of candidate speed funnels determined in FIG. 7, in accordance with an example embodiment;

FIGS. 9A-9B illustrate schematic diagrams showing determining a route speed funnel from a primary speed funnel in FIGS. 8A-8B, in accordance with an example embodiment; and FIGS. 10A-10C illustrate schematic diagrams showing merging of a plurality of route speed funnels to obtain a final route speed funnel exemplarily illustrated in FIG. 5, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "speed funnel" may be used to refer to a group of two or more speed limit signs indicating a change in sign values of speed limit signs from one end of the speed funnel to the other. A speed funnel may be used as an indication for a roadwork zone, an upcoming tunnel on a pathway, or a transition from a highway to a ramp.

The term "route speed funnel" may be used to refer to a speed funnel that indicates a roadwork zone on a route.

The term "route" may be used to refer to a path from a source location to a destination location on any link.

End of Definitions

A method, a system, and a computer program product are provided herein in accordance with an example embodiment for generating at least one route speed funnel for roadwork zone identification. Roadwork zones are temporarily defined by authorities to take up road repair work of a section of the road or an entire road. In such cases, the authorities may merge the two lanes of a road, or divert a lane to a by-lane, etc. Such road work repairs are intimated to travelers in advance of the actual commencement of the roadwork zone because such merging of the lanes may require reduction in speed of the vehicles to avoid collision or any mishap. Thus, at least one speed funnel may usually precede the roadwork zone. Vehicles may detect the speed funnels along a pathway in the vicinity of a roadwork as exemplarily illustrated in FIG. 5. Speed funnels may also indicate an upcoming tunnel on a pathway, or a transition from a highway to a ramp. There is a need for a method and a system to filter out the speed funnels to obtain route speed funnels indicating only a roadwork zone on a route of a vehicle. Additionally, many route speed funnels may occur en route to a destination location indicating roadwork zones. In such scenarios, there is need for the method and the system to merge the route speed funnels with same starting location or same end location to obtain at least one final route speed funnel.

FIG. 1 illustrates a schematic diagram of a system 100 for generating at least one route speed funnel for roadwork zone identification, in accordance with an example embodiment. The system 100 includes a user equipment (UE) or a user device 101, which may be in communication with a mapping platform 105, over a network 103. The network 103 may be wired, wireless, or any combination of wired and wireless communication networks, such as cellular, Wi-Fi, internet, local area networks, or the like. The user equipment 101 may be a navigation system, that may be configured to provide route guidance and navigation related functions to the user of a vehicle. In some embodiments, the user equipment 101 may be installed in the vehicle and may capture road signs along pathways. The user equipment 101 may also include an image capturing device, such as a camera for capturing the road signs, for example speed limit signs. On capturing the road signs, the user equipment 101 generates road sign observations. The vehicle may also include one or more sensors for generating the road sign observations. The road signs may be static road signs or variable road signs positioned along the pathways. Sign values of variable road signs may vary based on traffic conditions in the vicinity of the variable road signs, such as, LCD display panels, LED panels, etc. The user equipment 101 or the sensors in the vehicle may transmit the generated road sign observations to an OEM cloud sequentially. In an embodiment, the road sign observations may be scheduled to be transmitted to the OEM cloud in batches.

The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a user interface of a mapping application, such that the user equipment 101 may provide navigational assistance to the user among other services provided through access to the mapping platform 105.

As exemplarily illustrated, the mapping platform 105 may also include a map database 107, which may store node data, road segment data or link data, point of interest (POI) data, posted signs related data or the like. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include data about the POIs and their respective locations in the POI records. The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the mapping platform 105. The map database 107 may additionally include data related to roadwork zones, such as, location of the roadwork zones, diversions to be caused due to the roadwork zones, suggested routes to avoid congestion to be caused due to the roadwork zones, etc. The data related roadwork zones may be fetched by the system 100 from external systems, such as, roadwork planning system of the municipalities.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 107 of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 101, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the map database 107 may be a master geographic database configured at a server side, but in alternate embodiments, a client side map database 107 may represent a compiled navigation database that may be used in or with end user devices (e.g., user equipment 101) to provide navigation, speed adjustment and/or map-related functions to navigate through roadwork zones. The mapping platform 105 may cluster the road sign observations to generate learned road signs that are map-matched on links of a map developed by the map developer. From the learned road signs, the mapping platform 105 may generate primary speed funnels as disclosed in the detailed description of FIG. 3. Furthermore, the mapping platform 105 may generate at least one route speed funnel indicating a roadwork zone from the primary speed funnels. The map database 107 may be used with the end user device, that is, the user equipment 101 to provide the user with navigation features. In such a case, the map database 107 may be downloaded or stored on the user equipment 101 which may access the mapping platform 105 through a wireless or wired connection, over the network 103.

In one embodiment, the user device or the user equipment 101 may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, for example, and for determination of one or more personalized routes or route segments based on one or more calculated and recorded routes, according to some example embodiments. In some embodiments, the user of the vehicle may be notified by the mapping platform 105 about location of the roadwork zones and the user may use the user equipment 101, for example, the in-vehicle navigation system for navigation and map functions such as guidance and map display, according to some example embodiments. The user equipment 101 may include an application, for example, a mapping application with a user interface that may enable the user to access the mapping platform 105 for availing the functions disclosed above, such as, for navigating through identified roadwork zones on generating at least one route speed funnel.

FIG. 2 exemplarily illustrates a block diagram of one embodiment of a system 200 for generating at least one route speed funnel for roadwork zone identification for navigation of a vehicle 201 through a roadwork zone using a mapping platform 105. The vehicle 201 may be a user driven vehicle or an autonomous vehicle. An autonomous vehicle, as used throughout this disclosure, may refer to a vehicle having autonomous driving capabilities at least in some conditions. For example, the autonomous vehicle may exhibit autonomous driving on streets and roads having physical dividers between driving lanes. The system 200 includes a user equipment 101, including an application 203 with a user interface 205 for accessing one or more map and navigation related functions. The user equipment 101 may also include one or more sensors 207 such as a camera, an acceleration sensor, a gyroscopic sensor, a LIDAR sensor, a proximity sensor, a motion sensor and the like. The sensors 207 may primarily be used for detecting road signs and determining positioning of the vehicle 201 and the sensors 207 may be built-in or embedded into or within interior of the user equipment 101. In some embodiments, the user equipment 101 uses communication signals for position determination. The user equipment 101 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors 207 may be used to gather information related to an environment of the vehicle 201, such as, the roadwork zone. In some embodiments, the vehicle 201 may have sensors positioned on or within and the sensors may provide data indicating a location of the vehicle 201, heading data associated with road signs, sign types of the road signs, sign values of the road signs along pathways approaching a roadwork zone, and any other kinds of lane markings indicating a roadwork zone that is approaching. The data collected by the sensors may be transmitted to the OEM cloud. Vehicle data, also referred to herein as "probe data", may be collected by any device capable of determining the necessary information, and providing the necessary information to a remote entity. The user equipment 101 is one example of a device that may function as a probe to collect probe data of a vehicle 201.

More specifically, probe data collected by the user equipment 101 may be representative of the location of a vehicle 201 at a respective point in time and may be collected while a vehicle 201 is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a timestamp associated with the data collection, or the like. The user equipment 101, may be any device capable of collecting the aforementioned probe data. In one example, using the sensor data from the user equipment 101, a mapping platform 105 similar to the mapping platform exemplarily illustrated in FIG. 1, may generate at least one route speed funnel for roadwork zone identification to assist the vehicle 201 to navigate through the roadwork zone. The sensor data generated by the sensors 207 may constitute road sign observations. That is, the sensors 207 installed in the vehicle or the user equipment may capture road signs along the pathway and capture the location of the road sign, type of the road sign, value of the road sign, heading at the location of the road sign, and timestamp associated with the time of capture of the road sign. The captured location of the road sign, type of the road sign, value of the road sign, heading at the location of the road sign, and timestamp associated with the capture of the road sign constitute the road sign observations. The processing of the road sign observations to generate learned road signs and processing of the learned road signs to generate at least one route speed funnel is performed by the processor 303, exemplarily illustrated in FIG. 3, same as a processing component 109 exemplarily illustrated in FIG. 1, in the mapping platform 105 exemplarily illustrated in FIG. 3.

The system 200 may further include a services platform 209, which may be used to provide navigation related functions and services 211a-211i to the application 203 running on the user equipment 101. The services 211a-211i may include such as navigation functions, speed adjustment functions, traffic related updates, weather related updates, warnings and alerts, parking related services, indoor mapping services and the like. The services 211a-211i may be provided by a plurality of content providers 213a-213k. In some examples, the content providers 213a-213k may access various SDKs from the services platform 209 for implementing one or more services. In an example, the services platform 209 and the mapping platform 105 may be integrated into a single platform to provide a suite of mapping and navigation related applications for OEM devices, such as the user equipment 101. The user equipment 101 may be configured to interface with the services platform 209, the content provider's services 213a-213k, and the mapping platform 105 over a network 103. Thus, the mapping platform 105 and the services platform 209 may enable provision of cloud-based services for the user equipment 101, such as, storing the road sign observations in a OEM cloud in batches or in real-time and retrieving the stored road sign observations for generating at least one route speed funnel for roadwork zone identification, as disclosed in the detailed description of FIG. 3, by the vehicle 201 carrying the user equipment 101.

FIG. 3 illustrates a block diagram of a mapping platform 105 exemplarily illustrated in FIG. 2 that may be used to generate at least one route speed funnel for roadwork zone identification, in accordance with an example embodiment of the present invention. In the embodiments described herein, the mapping platform 105 comprises a data communication module 301, a learned sign generation module 305, a speed funnel filter 307, a speed funnel validation module 309, a route speed determination module 311, a funnel merger 313, and a user interface module 315. In this embodiment exemplarily illustrated in FIG. 3, the learned sign generation module 305, the speed funnel filter 307, the speed funnel validation module 309, the route speed determination module 311, and the funnel merger 313 are embodied within a processor 303. The processor 303 may retrieve computer program code instructions that may be stored in a memory 317 for execution of the computer program code instructions by the modules 305, 307, 309, 311, and 313 of the mapping platform 105. The processor may control the execution of the computer program code instructions by the various modules (viz. 301, 305, 307, 309, 311, 313, and 315) of the mapping platform 105. In one embodiment, the data communication module 301 communicates with the sensors 207 disclosed in the detailed description of FIG. 2 and may receive the sensor data and the road sign observations from the sensors 207. In an embodiment, the data communication module 301 may receive the road sign observations from the OEM cloud over the network 103. The road sign observations may refer to sensor data collected from cars as sensors, that is, sensors are installed in the vehicle 201 or in the user equipment 101 in the vehicle 201. The sensor data may be generated on detection of static road signs positioned along the pathways. In an embodiment, the road sign observations may refer to sensor data from digital or dynamic signs, such as, LED panels, LCD panels, etc., positioned along the pathways. In some example embodiments, the data communication module 301 may also receive destination information of a user of the vehicle 201 via the network 103. The road sign observations comprise time of capture of the road sign from vehicles such as, 201 as a timestamp associated with each of the road sign observations. A plurality of vehicles, such as, 201 passing by the location of each of the road signs on the pathway, generate a plurality of road sign observations for each of the road signs. Thus, each road sign observation is different from other road sign observation based on location data, heading data, road sign value, and road sign type, and time of capture of the road sign from a vehicle. The data communication module 301 may receive sensor data configured to describe a position of the user equipment 101 installed in the vehicle 201, or a controller of the user equipment 101 may receive the sensor data from the positioning system of the user equipment 101. The location of the road sign is the location of capture of the road sign from vehicles, such as, 201 and the location of the road sign constitutes the location data in a road sign observation.

Similarly, the heading associated with a road sign is the heading of the vehicle capturing the road sign and the heading of the road sign is the heading data in a road sign observation. The data inputted to the mapping platform 105, for example, the sensor data, etc., is transformed, processed, and executed upon by the mapping platform 105 to generate learned road signs by the learned sign generation module 305 as disclosed below. The sensor data from the different sensors installed in the user equipment 101 or the vehicle 201 may be converted to units and ranges compatible with the mapping platform 105, to accurately generate learned road signs that are map-matched.

In some example embodiments, the learned sign generation module 305 may generate a plurality of learned road signs from a plurality of road sign observations captured by the plurality of vehicles, such as, 201. The learned road signs generated are associated with corresponding locations, corresponding headings, and corresponding sign values. The learned sign generation module 305 learns the road signs from at least 3 road sign observations. The learned road signs may comprise different road signs, such as, speed limit signs, traffic signs, a gantry, etc. The learned sign generation module 305 map-matches the learned road signs on links of a map. The learned road sign "End of Speed limits and passing limits" is considered to have a sign value of 130 km/hr and the learned road sign "Speed Limit start" is considered to have a sign value of 0 km/hr. The learned sign generation module 305 may cluster the road sign observations based on at least three of the location data, the heading data, the sign value, the sign type, and the map-matched link. The learned sign generation module 305 may use a clustering algorithm, for example, k-means algorithm on the location data to cluster the road sign observations with a search radius of, for example, 15 meters. The clustering by the learned sign generation module 305 may distinguish the road sign observations based on the sign value, the sign type, and the map-matched link. The learned signs are clustering centroid of the road sign observations. In an embodiment, the learned sign generation module 305 may cluster the road sign observations based on a lateral offset in each of the road sign observations and permanency of the road sign observations. In an embodiment, the learned sign generation module 305 may not distinguish a lateral offset of the road signs along a pathway constituting one or more road sign observations in generating learned road signs as disclosed in the detailed description of FIGS. 6A-6B. In an embodiment where at least two road signs are positioned at a same location for different conditions along a pathway, the learned sign generation module 305 may remove the learned road sign with a lower sign value after clustering of the road sign observations as disclosed in the detailed description of FIGS. 6A-6B. In an embodiment, the learned sign generation module 305 may use the learned road signs, such as, "SPEED_LIMIT_START" and "ALL_RESTRICTIONS_END" apart from learned speed limit signs to segregate the learned road signs occurring between the "SPEED_LIMIT_START" and "ALL_RESTRICTIONS_END" learned road signs. That is, a start of a roadwork zone is typically indicated with the road sign "SPEED_LIMIT_START", an end of the roadwork zone is typically indicated with the road sign "ALL_RESTRICTIONS_END", and the speed limits signs are positioned between the start and the end of the roadwork zone. Each of the generated learned road signs may constitute a primary speed funnel. Each primary speed funnel may include a different pair of learned road signs from the generated learned road signs. The primary speed funnel may indicate an approaching roadwork zone or a leaving roadwork zone. That is, the primary speed funnel with decreasing sign values of the learned road signs indicates an approaching roadwork zone. The primary speed funnel with increasing sign values of the learned road signs indicates an end of a roadwork zone, as the vehicle 201 may be accelerated after the roadwork zone is crossed.

The speed funnel filter 307 determines a plurality of primary speed funnels from the plurality of the learned road signs. For determining the plurality of primary speed funnels, the speed funnel filter 307 may determine a plurality of candidate speed funnels based on the corresponding locations comprising latitude and longitude co-ordinates, the corresponding headings, the corresponding sign values, the corresponding sign types of the plurality of learned road signs. For each learned road sign, the speed funnel filter 307 calculates distances between the corresponding locations of each learned road sign and the corresponding locations of the other generated learned road signs. The speed funnel filter 307 may configure a threshold distance range, such as, between 15 meters and 1200 meters within which the calculated distances may lie. That is, for a speed funnel to indicate a roadwork zone, the speed limit signs along the pathway are positioned at a distance greater than 15 meters and less than 1200 meters from each other. The speed funnel filter 307 filters the generated learned road signs based on the threshold distance range and obtains a plurality of distance filtered learned road signs as exemplarily illustrated in FIG. 7. For each of the distance filtered learned road signs, the speed funnel filter 307 determines heading filtered learned road signs with a heading difference between the heading of each of the distance filtered learned road sign and the heading of the other distance filtered learned road signs lying within a threshold heading range, such as, less than 40 degrees and greater than 320 degrees as exemplarily illustrated in FIG. 7. The speed funnel filter 307 further obtains a plurality of sight filtered learned road signs by filtering the plurality of heading filtered learned road signs based on a heading of sight difference between each pair of the plurality of heading filtered learned road signs lying within a threshold sight range, such as, less than 40 degrees and greater than 320 degrees as exemplarily illustrated in FIG. 7. A heading of sight may refer to a vector between each pair of the plurality of heading filtered learned road signs. A heading of sight difference may refer to a difference in the heading of sight of each pair of the plurality of heading filtered learned road signs. For a heading filtered learned road sign, the speed funnel filter 307 selects another heading filtered learned road sign to form a pair of sight filtered learned road signs, such that, the difference in the heading of the vector between the heading filtered learned road signs and heading associated with one of the heading filtered learned road signs is smaller than 40 degrees or greater than 320 degrees. To obtain the candidate speed funnels, the speed funnel filter 307 may further filter the sight filtered learned road signs based on a difference in the sign values of each pair of the sight filtered learned road signs within a threshold value range, such as, within 30 km/hr and may obtain a plurality of pairs of value filtered learned road signs. That is, the speed limit signs along the pathway indicating a roadwork zone may have a difference of 30 km/hr between them. The speed funnel filter 307 may further filter the plurality of pairs of value filtered learned road signs based on the corresponding locations of the value filtered learned road signs in each pair of the plurality of value filtered learned road signs as exemplarily illustrated in FIG. 7, to obtain position filtered learned road signs. Each pair of position filtered learned road signs constitute a candidate speed funnel and the speed funnel filter 307 determines a plurality of such candidate speed funnels. Each candidate speed funnel has a position filtered learned road sign with a higher sign value at a first position or a start position and another position filtered learned road sign at a second position or an end position in the candidate speed funnel with a lower sign value, compared to the sign value of the position filtered learned road sign at the first position as disclosed in the detailed description of FIG. 7.

Since the road sign observations are anonymized, that is, the road sign observations are not associated with a vehicle identifier, there is a need to validate the candidate speed funnels if the pair of position filtered learned road signs in the candidate speed funnels are detected during same hour of the day. The speed funnel validation module 309 determines a plurality of primary speed funnels by temporally validating the plurality of candidate speed funnels based on a correlation of corresponding timestamps of the plurality of road sign observations associated with the pair of position filtered learned road signs in each of the candidate speed funnels as disclosed in the detailed description of FIGS. 8A-8B. In an embodiment, the speed funnel validation module 309 temporally validates the plurality of candidate speed funnels from variable road signs. The temporal validation facilitates judging of whether the pair of the position filtered learned road signs in each of the candidate speed funnels is detected during same hours of the day, since the candidate speed funnels formed by the pair of position filtered learned road signs detected during different hours of day do not indicate a true speed reduction alert to the vehicles, such as, 201.

Each of the road sign observations may have a corresponding timestamp and the speed funnel validation module 309 may extract a detection time of each of the road sign observations associated with the generation of the position filtered learned road signs in each of the candidate speed funnels. The timestamp in a road sign observation may be indicated as an epoch time in total number of seconds, such as, 1529699523, since Jan. 1, 1970. The epoch time may be measured by UTC time zone. The total number of epoch times of the road sign observations per a position filtered learned road sign may not cover all times in a day. That is, the road sign observations associated with the generation of a positioned filtered learned road sign may be generated only during certain hours in a day, such as, during morning, if the speed limit signs are positioned along the pathway towards the business district, etc.

The speed funnel validation module 309 converts the timestamp of the road sign observations of each of the position filtered learned road sign in a candidate speed funnel into a normal time format including date in MM-DD-YYYY format and time in hours and minutes (HH:MM). The speed funnel validation module 309 may further extract value of hours in the timestamp of the road sign observations of each of the position filtered learned road signs in the candidate speed funnel and tabulates the number of road sign observations associated with each of the position filtered learned road sign at a same hour as exemplarily illustrated in FIGS. 8A-8B. That is, the speed funnel validation module tabulates the road sign observations associated with each of the position filtered learned road sign at different hours in a day, such as, 16:00 hours, 17:00 hours, 11:00 hours, etc. The speed funnel validation modules assigns a value 0 for no road sign observations associated with a position filtered learned road sign at a certain hour in the day.

The speed funnel validation module 309 calculates a correlation value of the number of road sign observations associated with the position filtered learned road signs tabulated at different hours in a day. The speed funnel validation module 309 may calculate the correlation value using an equation:

$$\mathrm{Cor}(X,Y) = E[(X-\mu_X)(Y-\mu_Y)]/\sigma_X \sigma_Y$$

where X and Y are respective number of road sign observations per hour per each of the position filtered learned road sign, $\mu_X$ and $\mu_Y$ are the mean of the number of road sign observations and ax and ay are the standard deviation in the number of the road sign observations; E[ ] calculates the expectation. In an embodiment, if either $\sigma_X$ or $\sigma_Y$ is 0, the speed funnel validation module 309 may convert the $\sigma_X$ or $\sigma_Y$ into a very small number, such as, 0.0000001. In an embodiment, if the road sign observations associated with the position filtered learned road signs have a count only at a single hour in a day and at the rest of the hours, the number of road sign observations is 0, the speed funnel validation module 309 calculates the correlation value to be 1. Based on the calculated correlation value, the speed funnel validation module 309 validates or invalidates the candidate speed funnel. The validated candidate speed funnels with a non-negative correlation value between the corresponding timestamps of the road sign observations associated with the pair of position filtered learned road signs are the primary speed funnels. If the speed funnel validation module 309 determines from the corresponding timestamps, that the two position filtered learned road signs in a candidate speed funnel are detected during different times of the day, the speed funnel validation module 309 invalidates the candidate speed funnel. The candidate speed funnels with a negative correlation value between the corresponding timestamps of the road sign observations associated with the pair of position filtered learned road signs are invalidated.

The route speed funnel determination module 311 may generate at least one route speed funnel from the plurality of primary speed funnels based on a route validity condition. The route validity condition is based on one or more links between the position filtered learned road signs of each of the primary speed funnels. The route validity condition includes a total length of one or more links lying within a threshold length, for example, 1500 meters and a heading difference between the one or more links lying within a threshold heading range, for example, between 40 degrees and 320 degrees as exemplarily illustrated in FIGS. 9A-9B. The route speed funnel determination module 311 determines at least one route speed funnel that is on route towards destination of the user. For a primary speed funnel to be one of the at least one route speed funnel, the route speed funnel determination module 311 may determine the total length of the links between the position filtered learned road signs. In an embodiment, the route speed funnel determination module 311 further may compute heading difference of each pair of links between the position filtered learned road signs. In computing the total length and the heading difference, the route speed funnel determination module 311, may take into account the link on which the positioned filtered learned road signs are positioned. The generated route speed funnel may have a pair of position filtered learned road signs. Each position filtered learned road sign may be positioned at a first position and a second position in the route speed funnel.

In an embodiment, where at least two route speed funnels are determined by the route speed determination module 311 and if two or more route speed funnels of the at least two route speed funnels have a same position filtered learned road sign at a first position or a second position in the route speed funnels, the funnel merger 313 may discard the route speed funnel with distance between the position filtered learned road signs is larger as exemplarily illustrated in FIGS. 10A-10C. In an embodiment, where at least two route speed funnels are determined by the route speed determination module 311 and if a position filtered learned road sign in a second position of the route speed funnel is same a position filtered learned road sign in a first position of another route speed funnel, the funnel merger 313 may combine the two route speed funnels with a common position filtered learned road sign to generate a final route speed funnel as exemplarily illustrated in FIGS. 10A-10C. In an embodiment, the maximum number of position filtered learned road signs starting from a higher sign value to a lowest sign value in the final route speed funnel may be 4. The location of the roadwork zone may be in vicinity of the location associated with the position filtered learned road sign with the lowest sign value in the final route speed funnel.

Based on the generated final route speed funnel, the user interface module 315 may output notifications regarding an approaching roadwork zone on the user interface 205. In an embodiment, the user interface module 315 may render indications of a roadwork zone ahead on the user interface 205. In an embodiment, the user interface module 315 may provide navigation suggestions to the user of the vehicle 201 to avoid the roadwork zone based on the final route speed funnel generated by a plurality of vehicles plying on the pathway with speed limit signs indicating the roadwork zone. The different representations of the navigation suggestions may be in the form of a map with color coded or patterned road links indicating traffic conditions on the route, locations of route speed funnels on the route, etc. In an embodiment, the user interface module 315 may receive destination information from the user on the user interface 205 of the user equipment 101. In some example embodiments, the user interface module 315 may notify the users of the vehicles 201 via the user interface 205 of the user equipment 101 about roadwork zone ahead based on the generated route speed funnel. In some example embodiments, the user interface module 315 renders the notification about changes in navigation routes due to the roadwork zone ahead and impact of the modified roadwork zones on parking situations, in mobile applications or navigation applications used by the users. The user interface module 315 may be configured to update the rendered recommendations on receiving control instructions from the processor 303.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or processors capable of processing large volumes of workloads and operations to provide support for big data analysis. In an example embodiment, the processor 303 may be in communication with a memory 317 via a bus for passing information among components of the system 200. The memory 317 may be non-transitory and may include, for example, one or more volatile and/or non-volatile memories. In other words, for example, the memory 317 may be an electronic storage device (for example, a computer readable storage medium) comprising gates configured to store data (for example, bits) that may be retrievable by a machine (for example, a computing device like the processor 303). The memory 317 may be configured to store information, data, content, applications, instructions, or the like, for enabling the apparatus to carry out various functions in accordance with an example embodiment of the present invention. For example, the memory 317 could be configured to buffer input data for processing by the processor 303. As exemplarily illustrated in FIG. 3, the memory 317 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 200 disclosed herein. The IoT related capabilities may in turn be used to provide smart city solutions by providing real time parking updates, big data analysis, and sensor based data collection by using the cloud based mapping platform 105 for providing navigation and parking recommendation services and roadwork zone identification services. In some embodiments, the mapping platform 105 may be configured to provide an environment for development of parking strategy recommendation solutions for navigation systems in accordance with the embodiments disclosed herein. The environment may be accessed using the user interface module 315 of the mapping platform 105 disclosed herein. The user interface module 315 may provide an interface for accessing various features and data stored in the mapping platform 105.

In some embodiments, the mapping platform 105 may be configured to provide a repository of algorithms for implementing a plurality of location based services for navigation systems. For example, the mapping platform 105 may include algorithms related to geocoding, routing (multimodal, intermodal, and unimodal), clustering algorithms, machine learning in location based solutions, natural language processing algorithms, artificial intelligence algorithms, and the like. The data for different modules of the mapping platform 105 may be collected using a plurality of technologies including but not limited to drones, sensors, connected cars, cameras, probes, chipsets and the like. The collected data may be processed by the processor 303 to generate at least one route speed funnel according to the embodiments disclosed herein. As noted above, the mapping platform 105 may be embodied by the processing component. However, in some embodiments, the mapping platform 105 may be embodied as a chip or chip set. In other words, the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform 105 may therefore, in some cases, be configured to implement an example embodiment of the present invention on a single "system on a chip." As such, in some cases, a chip or chipset may constitute a means for performing one or more operations for providing the functionalities described herein.

The user interface 205 of the user equipment 101 may in turn be in communication with the processor 303 to provide output to the user and, in some embodiments, to receive an indication of a user input. In some example embodiments, the system 200 may include a user interface 205 that communicates with the processor 303 and displays input and/or output of the mapping platform 105. As such, the user interface 205 may include a display and, in some embodiments, may also include a keyboard, a mouse, a joystick, a touch screen, touch areas, soft keys, one or more microphones, a plurality of speakers, or other input/output mechanisms. In one embodiment, the processor 303 may comprise user interface circuitry configured to control at least some functions of one or more user interface elements such as a display and, in some embodiments, a plurality of speakers, a ringer, one or more microphones and/or the like. The processor 303 and/or user interface circuitry comprising the processor 303 may be configured to control one or more functions of one or more user interface elements through computer program instructions (for example, software and/or firmware) stored on a memory accessible to the processor 303 (for example, memory device 310, and/or the like). In some example embodiments, the processor 303 may be configured to provide a method for generating at least one route speed funnel for road work zone identification as will be discussed in conjunction with FIG. 4 as below.

FIG. 4 exemplarily illustrates a method 400 for generating at least one route speed funnel for roadwork zone identification, in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 317 of the mapping platform 105, employing an embodiment of the present invention and executed by a processor 303 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 317 that may direct a computer or other programmable apparatus to function in a particular manner, such that the instructions stored in the computer-readable memory 317 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flow diagram of FIG. 4 for generating at least one route speed funnel for roadwork zone identification includes, at 401, generating a plurality of learned road signs from a plurality of road sign observations captured by a plurality of vehicles. The plurality of road sign observations are anonymized, that is, the road sign observations do not include vehicle identifiers associated with the plurality of vehicles and the plurality of learned road signs are associated with corresponding locations, corresponding headings, and corresponding sign values. At 403, the method 400 may include determining a plurality of primary speed funnels from the plurality of learned road signs. Each of the plurality of primary speed funnels includes a different pair of learned road signs selected from the plurality of learned road signs. At 405, the method 400 may include generating at least one route speed funnel from the plurality of primary speed funnels based on a route validity condition as disclosed in the detailed description of FIG. 3.

In an example embodiment, a system for performing the method of FIG. 4 above may comprise a processor (e.g. the processor 303) configured to perform some or each of the operations (401-405) described above. The processor may, for example, be configured to perform the operations (401-405) by performing hardware implemented logical functions, executing stored instructions, or executing algorithms for performing each of the operations. Alternatively, the system may comprise means for performing each of the operations described above. In this regard, according to an example embodiment, examples of means for performing operations 401-405 may comprise, for example, the processor 303 and/or a device or circuit for executing instructions or executing an algorithm for processing information as described above.

On implementing the method 400 disclosed herein, the end result generated by the mapping platform 105 is a tangible determination of at least one route speed funnel for roadwork zone identification. Roadwork zones are preceded by speed funnels, lane markings, traffic cones, etc. Route speed funnels usually start from a distance from the roadwork zone to decelerate vehicles plying on the pathway towards the roadwork zone. The determination of the roadwork zone at the downstream of the route speed funnel by the mapping platform 105 aids the autonomous vehicles in transitioning from an autonomous mode to a manual mode smoothly. In a roadwork zone, operating the autonomous vehicle in the manual mode is preferred to avoid any undue mishaps or collisions from taking place. The mapping platform 105 is capable of determining the route speed funnel identifying the roadwork zones on highways, local roads, etc.

Example embodiments disclosed herein provides an improvement in navigation technology related to roadwork zone identification as follows: The roadwork zone may have numerous people working with heavy machinery. The roadwork zone may lead to a blockage on the road and may result in diversions or merging of the lanes of the road. A prior intimation of an approaching roadwork zone may avoid any accident from taking place at the roadwork zones due to plying vehicles and also saves travel time of users plying via the roadwork zone. An approaching roadwork zone may require a decrease in speed of the vehicles prior to the roadwork zone and in the roadwork zone. The decrease in speed of the vehicles may allow authorities to plan and manage movement of the heavy machinery at the roadwork zone to avoid mishaps. The mapping platform 105 uses road sign observations generated from the vehicles plying via a roadwork zone and may generate learned road signs. The learned road signs are map-matched to a link similar to the speed limit signs on a pathway prior to the roadwork zone. The mapping platform 105 may collect sensor data as disclosed in FIG. 2 from the vehicles on a day, obtain the road sign observations from the collected sensor data, and cluster the road sign observations based on location, heading, sign type, and sign value of the road signs on the same day. The collected sensor data may be stored in an OEM cloud and the mapping platform 105 may access the OEM cloud for clustering the road sign observations and storing the clusters in the OEM cloud again. On clustering, the mapping platform 105 removes outliers from the road sign observations to result in only a few learned road signs. Thus embodiments of the present invention result in lesser processing thereby leading to low resource utilization for solving a problem deeply rooted in navigation technology, autonomous vehicles, and vehicular safety. The mapping platform 105 extracts only learned road signs that indicate speed from other learned road signs corresponding to other road sign observations. The mapping platform 105 may further filter out the learned road signs to obtain position filtered learned road signs that may constitute a plurality of candidate speed funnels as disclosed in the detailed description of FIG. 3. Determining the candidate speed funnels is a time intensive and a processor intensive step which the mapping platform 105 is capable of performing accurately. From the determined candidate speed funnels, the mapping platform 105 may determine primary speed funnels and further may determine at least one route speed funnel identifying a roadwork zone. If more than one route speed funnel is generated, there may be a likelihood of the route speed funnels sharing a common learned road sign. In such cases to avoid duplication of common learned road signs, the mapping platform 105 may efficiently merge the route speed funnels with common learned road signs to generate a final route speed funnel. The final route speed funnel may aid in identifying a roadwork zone ahead. Such final route speed funnels may be stored in the map database 107 to aid in navigation of the vehicles through the roadwork zone until the roadwork takes place. The final route speed funnels stored in the map database 107 may constitute historic data for the authorities to plan roadwork in the future. In an embodiment, the route speed funnel may be one of the inputs apart from lane markings and traffic cones to a system to identify the roadwork zones ahead. The mapping platform 105, in an embodiment, may generate recommendations on navigation routes or different modes of transport preferable to avoid the roadwork zone based on the detected route speed funnel.

FIG. 5 illustrates a schematic diagram showing a speed funnel indicating a start of a roadwork zone, in accordance with an example embodiment. As exemplarily illustrated, a vehicle traveling towards a roadwork zone may be intimated about an approaching roadwork zone by a plurality of road signs, such as, a "men at work" sign, speed limit signs, etc. In an embodiment, the speed limit signs succeeding the "men at work" sign resemble a speed funnel. The sensors may capture road sign observations corresponding to the speed limit signs and the "men at work" sign. The mapping platform 105, based on the road sign observations, may generate learned road signs as disclosed in the detailed description of FIG. 3. Using the learned road signs, the mapping platform 105 determines candidate speed funnels based on the location, heading, and sign value of the learned road signs. The mapping platform 105 may further validate the determined candidate speed funnels and may determine a final route speed funnel comprising the learned road signs corresponding to the speed limit signs 90, 70, 50, and 30, in the same order as the position filtered learned road signs as disclosed in the detailed description of FIGS. 10A-10C. As exemplarily illustrated, the sign values of the position filtered learned road signs decreases from a highest value 90 km/hr to 30 km/hr. The roadwork zone may be searched in the vicinity of the position filtered learned road sign 30. In case of autonomous vehicles, on detecting the route speed funnel (90 70, 50, 30), the autonomous vehicle may shift from the autonomous mode to the manual mode to navigate through the roadwork zone carefully.

FIGS. 6A-6B illustrate schematic diagrams showing positioning of road signs, in accordance with an example embodiment. As exemplarily illustrated in FIG. 6A, a speed limit sign 100 may be located on both sides of a pathway approaching a roadwork zone. In such scenarios, the sensors 207 may generate road sign observations for both the speed limit signs. From the road sign observations, the learned sign generation module 305 of the mapping platform 105 may generate learned road signs corresponding to the speed limit signs. Since, the location of the learned road signs, the sign value of the learned road signs, and the sign type of the learned road sign are same, and the learned road sign is positioned on same directional link, the learned sign generation module 305 may merge the two learned road signs to one learned road sign or the learned sign generation module 305 may delete one of the two learned road signs.

As exemplarily illustrated in FIG. 6B, there may be more than one speed limit value in a speed limit sign on a pathway for different conditions, such, during a normal day and a rainy day, during different times of day, month, or year, etc. The sensors may generate more than one road sign observation for a speed limit sign and the learned sign generation module 305 may generate more than one learned road sign corresponding to the speed limit sign. Two or more learned road signs may be map-matched on a same directional link and the distance between them may be within 15 meters. In such scenarios, the learned sign generation module 305 may remove a learned road sign with a smaller sign value. On removing such learned road signs, a plurality of candidate speed funnels that have to be examined by the speed funnel filter 307, the speed funnel validation module 309, and the route speed funnel determination module 311 for being a route speed funnel, may be eliminated, thereby saving data processing power of the processor 303.

FIG. 7 illustrates a schematic diagram comprising steps for determining a candidate speed funnel from a plurality of learned road signs, in accordance with an example embodiment. As exemplarily illustrated, consider the learned road sign 50 is a target learned road sign that is part of a candidate speed funnel and the target learned road sign 50 has a sign value of 50 km/hr, heading of 90 degrees, and is a sign type indicating a speed limit start. For one of the learned road signs to constitute the candidate speed funnel along with the target learned road sign 50, the speed funnel filter 307 of the mapping platform 105 filters the learned road signs to determine qualified learned road signs in each step. The mapping platform 105 determines a Euclidean distance between the target learned road sign 50 and the other learned road signs and the speed funnel filter 307 determines the qualified learned road signs within a distance threshold range, for example, between 15 meters and 1200 meters from the target learned road sign 50. The learned road signs lying within a radius greater than 15 meters and less than 1200 meters from the target learned road sign 50 are determined to be qualified learned road signs or distance filtered learned road signs by the speed funnel filter 307. The speed funnel filter 307, further, determines qualified learned road signs or heading filtered learned road signs from the distance filtered learned road signs with a heading difference between 40 degrees and 320 degrees with the heading of the target learned road sign 50. The speed funnel filter 307 may further determine qualified learned road signs or sight filtered learned road signs from the heading filtered learned road signs with heading of sight formed by the heading filtered learned road signs with the target learned road sign 50 with the heading of the target learned road sign 50 is less than 40 degrees or greater than 320 degrees. The speed funnel filter 307 may further determine qualified learned road signs or value filtered learned road signs from the sight filtered learned road signs with sign value less than 50 and within a sign value difference of 30 km/hr from the target learned road sign 50. The speed funnel filter 307 may further determine qualified learned road signs or position filtered learned road signs from the value filtered learned road signs based on the position of the value filtered learned road signs with respect to the target learned road sign 50. That is, if the target learned road sign 50 is map-matched to a ramp, the value filtered learned road sign to be a position filtered learned road sign cannot be positioned on a non-ramp. Also, if the target learned road sign 50 is positioned on a non-ramp, the value filtered learned road sign with a lower sign value compared to the target learned road sign 50 cannot be positioned on a ramp. The speed funnel filter 307 may compare ramp indicators associated with the links on which the target learned road sign 50 and the value filtered learned road signs are positioned to filter out the position filtered learned road signs. The speed funnel filter 307 determines the qualified learned road signs or the position filtered learned road signs with sign values, 40 km/hr and 30 km/hr. Thus, the candidate speed funnels are (50, 40), and (50, 30). The speed funnel validation module 309 of the mapping platform 105 validates the candidate speed funnels (50, 40), and (50, 30) to determine one or more primary speed funnels.

FIGS. 8A-8B illustrate tabular representations showing determining a primary speed funnel from the plurality of candidate speed funnels determined in FIG. 7, in accordance with an example embodiment. As disclosed in the detailed description of FIG. 3, the speed funnel validation module 309 may temporally validate the candidate speed funnels to determine primary speed funnels based on the corresponding timestamps of the road sign observations associated with the position filtered learned road signs in the candidate speed funnels. As exemplarily illustrated in FIG. 8A, the speed funnel validation module 309 may validate the candidate speed funnels (50, 40) and (50, 30) if the position filtered learned road signs are detected during the same hour of the day. If the position filtered learned road signs are detected during different times of day, the speed funnel validation module 309 finds the candidate speed funnels (50, 40) and (50, 30) to be false positive. In the candidate speed funnel (50, 40), the speed funnel validation module 309 computes correlation of number of road sign observations associated with the position filtered learned road signs at different hours of a day and tabulates as exemplarily illustrated in FIG. 8A. As exemplarily illustrated, at 1:00 hrs of the day, the speed funnel validation module 309 determines that 23 road sign observations associated with the position filtered learned road sign 50 are generated by the sensors 207 while no road sign observations associated with the position filtered learned road sign 40 are generated by the sensors 207. That is, the speed limit sign 50 is detected along the pathway by 23 vehicles at 1:00 hrs while the position learned road sign 40 is not detected by the vehicles at 1:00 hrs. Similarly, at 3:00 hrs, the speed funnel validation module 309 determines that 11 road sign observations associated with the position filtered learned road sign 50 are generated while 34 road sign observations associated with the position filtered learned road sign 40 are generated. At 4:00 hrs, the speed funnel validation module 309 determines that no road sign observations associated with the position filtered learned road sign 50 are generated while 22 road sign observations associated with the position filtered learned road sign 40 are generated. At 6:00 hrs, the speed funnel validation module 309 determines that 23 road sign observations associated with the position filtered learned road sign 50 are generated while 12 road sign observations associated with the position filtered learned road sign 40 are generated. The speed funnel validation module 309 calculates the correlation value as −0.38216 between the number of road sign observations associated with the position filtered learned road signs 50 and 40 respectively as disclosed in the detailed description of FIG. 3. The speed funnel validation module 309 eliminates the candidate speed funnel (50, 40) from being a primary speed funnel on determining the correlation value to be less than 0. From the tabular representation, it may be concluded that the position filtered learned road signs 50 and 40 may be positioned on different routes and may not be on same paths. During the early hours of a day, the route on which the position filtered learned road sign 50 is located witnesses more number of vehicles while the route on which the position filtered learned road sign 40 is located witnesses more number of vehicles during office hours of the day.

Similarly, in the candidate speed funnel (50, 30), the speed funnel validation module 309 computes correlation of number of road sign observations associated with the position filtered learned road signs at different hours of a day and tabulates as exemplarily illustrated in FIG. 8B. As exemplarily illustrated, at 10:00 hrs of the day, the speed funnel validation module 309 determines that 44 road sign observations associated with the position filtered learned road sign 50 are generated by the sensors 207 while 12 road sign observations associated with the position filtered learned road sign 30 are generated by the sensors 207. Similarly, at 12:00 hrs, the speed funnel validation module 309 determines that 15 road sign observations associated with the position filtered learned road sign 50 are generated while 12 road sign observations associated with the position filtered learned road sign 30 are generated. At 13:00 hrs, the speed funnel validation module 309 determines that there are no road sign observations associated with the position filtered learned road signs 50 and 30. That is, there is no detection of the speed limit signs 50 and 30 along the pathway by any vehicle. At 14:00 hrs, the speed funnel validation module 309 determines that 1 road sign observation associated with the position filtered learned road sign 50 is generated while there are no road sign observations associated with the position filtered learned road sign 30. The speed funnel validation module 309 calculates the correlation value as 0.5157 between the number of road sign observations associated with the position filtered learned road signs 50 and 30 respectively as disclosed in the detailed description of FIG. 3. The speed funnel validation module 309 validates the candidate speed funnel (50, 30) to be a primary speed funnel on determining the correlation value to be larger than 0. Therefore, out of the two candidate speed funnels (50, 40) and (50, 30), the speed funnel validation module 309 may determine the candidate speed funnel (50, 30) to be a primary speed funnel.

FIGS. 9A-9B illustrates a schematic diagram showing a route speed funnel from a primary speed funnel in FIGS. 8A-8B, in accordance with an example embodiment. As disclosed in the detailed description of FIG. 3, the route speed funnel determination module 311 of the mapping platform 105 may determine a route speed funnel from the primary speed funnels based on a route validity condition. The position filtered learned road signs 50 and 30 in the primary speed funnel (50, 30) may have connecting links in between. For the primary speed funnel (50, 30) to be a route speed funnel, the route speed funnel determination module 311 may compute a total length of the connecting links and the heading difference between pairs of the connecting links. According to the route validity condition, the total length of the connecting links between the position filtered learned road signs 50 and 30 have to be less than 1500 meters and heading difference between pairs of the connecting links must be less than 40 degrees of greater than 320 degrees. Based on the route validity condition, the route speed funnel determination module 311 may determine the primary speed funnel exemplarily illustrated in FIG. 9A to be a route speed funnel. Consider, the position filtered learned road signs 50 and 30 are positioned as shown in FIG. 9B. The position filtered learned road signs 50 and 30 may have a total length of connecting links between them to be less than 1500 meters. However, the heading difference of the connecting links between the position filtered learned road signs 50 and 30 is greater than 40 degrees as exemplarily illustrated in FIG. 9B. Since the route validity condition is not satisfied, the route speed funnel determination module 311 eliminates the primary speed funnel exemplarily illustrated in FIG. 9B from being a route speed funnel.

FIGS. 10A-10C illustrate schematic diagrams showing merging of a plurality of route speed funnels to obtain one or more final route speed funnels, in accordance with an example embodiment. As exemplarily illustrated in FIG. 10A, if two route speed funnels (50, 30) and (50, 40) have a common position filtered learned road sign 50 at a first position, the funnel merger 313 of the mapping platform 105 may eliminate the route speed funnel (50, 40) and retain the route speed funnel (50, 30) on comparing the distance between the position filtered learned road signs in the route speed funnels and considering the route speed funnel with (50, 30) with smaller distance between the position filtered learned road signs 50 and 30. As exemplarily illustrated in FIG. 10B, if two route speed funnels (50, 30) and (40, 30) have a common position filtered learned road sign 30 at a second position, the funnel merger 313 may eliminate the route speed funnel (40, 30) and retain the route speed funnel (50, 30) on comparing the distance between the position filtered learned road signs in the route speed funnels and considering the route speed funnel with (50, 30) with smaller distance between the position filtered learned road signs 50 and 30. Similarly, consider the mapping platform 105 also determines the route speed funnels (90, 70), (70, 50), and (20, 10) as exemplarily illustrated in FIG. 10C. The funnel merger 313 determines that a common position filtered learned road sign is present between each pair of route speed funnels. That is, between the route speed funnel (90, 70) and route speed funnel (70, 50), the position filtered learned road sign 70 is common. Similarly between the route speed funnel (70, 50) and route speed funnel (50, 30), the position filtered learned road sign 50 is common. The funnel merger 313 merges the route speed funnels as disclosed in the detailed description of FIG. 3 to obtain a final route speed funnel (90, 70, 50, 30) as exemplarily illustrated in FIG. 10C. The funnel merger 313 assigns a funnel identifier F1 to the final route speed funnel (90, 70, 50, 30). The generate route speed funnel indicates a roadwork zone in the downstream of the position filtered learned road sign 30.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for generating at least one route speed funnel for road work zone identification, the method comprising:
   generating, by a processor, a plurality of learned road signs from a plurality of road sign observations captured by a plurality of vehicles;
   determining a plurality of primary speed funnels indicating an approach to or a leaving from a road work zone, each of the plurality of primary speed funnels comprising a different pair of learned road signs selected from the generated plurality of learned road signs, wherein the different pair of learned road signs indicate a change in sign values of speed limits;
   generating the at least one route speed funnel from the plurality of primary speed funnels based on a route validity condition, wherein the route validity condition is based on one or more links between the different pair of learned road signs of each of the plurality of primary speed funnels, and wherein the at least one route speed funnel relates to a route that includes the road work zone.

2. The method of claim 1, wherein the generating of the plurality of learned road signs from the plurality of road sign observations comprises processing the plurality of road sign observations based on location data of the plurality of road sign observations.

3. The method of claim 1, wherein the generated plurality of learned road signs are associated with corresponding locations, corresponding headings, corresponding road sign values, and corresponding road sign types.

4. The method of claim 3, wherein the determining of the plurality of primary speed funnels comprises:
   determining a plurality of candidate speed funnels, based on the corresponding locations, the corresponding headings, the corresponding road sign values, and the corresponding road sign types of the plurality of learned road signs,
   wherein each of the plurality of candidate speed funnels comprises a different pair of learned road signs selected from the generated plurality of learned road signs; and
   determining the plurality of primary speed funnels by temporally validating the determined plurality of candidate speed funnels based on a correlation of corresponding timestamps of the plurality of road sign observations associated with the different pair of learned road signs in each of the determined plurality of candidate speed funnels.

5. The method of claim 4, wherein the determining of the plurality of candidate speed funnels comprises:
   calculating a plurality of distances between the corresponding locations of learned road signs of each pair of learned road signs in the generated plurality of learned road signs;
   filtering the generated plurality of learned road signs based on the calculated plurality of distances lying within a threshold distance range, to obtain a plurality of distance filtered learned road signs;
   determining a plurality of heading filtered learned road signs from the plurality of distance filtered learned road signs based on a heading difference between each pair of the plurality of distance filtered learned road signs lying within a threshold heading range; and
   obtaining a plurality of sight filtered learned road signs by filtering the plurality of heading filtered learned road signs based on a heading of sight difference between each pair of the plurality of heading filtered learned road signs lying within a threshold sight range.

6. The method of claim 5, wherein the determining of the plurality of candidate speed funnels further comprises:
   filtering the plurality of sight filtered learned road signs based on a difference in the corresponding road sign values of each pair of the plurality of sight filtered learned road signs lying within a threshold value range, to obtain a plurality of value filtered learned road signs;
   filtering a plurality of pairs of value filtered learned road signs from the plurality of value filtered learned road signs based on the corresponding locations of value filtered learned road signs in each pair of the plurality of value filtered learned road signs; and
   determining the plurality of candidate speed funnels based on the filtered plurality of pairs of value filtered learned road signs.

7. The method of claim 6, wherein the determining of the plurality of candidate speed funnels further comprises:
   filtering the plurality of value filtered learned road signs based on the corresponding locations of the value filtered learned road signs in each pair of the plurality of value filtered learned road signs to obtain position filtered learned road signs; and
   calculating a correlation value associated with the position filtered learned road signs using the equation:

$$\mathrm{Cor}(X,Y) = E[(X-\mu X)(Y-\mu Y)]/\sigma X \sigma Y$$

wherein, X and Y each represent a number of road sign observations per hour for each of the position filtered learned road signs,
   wherein, $\mu X$ and $\mu Y$ represent a mean number of road sign observations for each of the position filtered learned road signs, and wherein, σX and σY represent the standard deviation for the number of road sign observations for each of the position learned road signs.

8. The method of claim 1, wherein the route validity condition comprises a total length of the one or more links lying within a threshold length and a heading difference between the one or more links lying within a threshold heading range.

9. The method of claim 1, wherein the generated at least one route speed funnel comprises two or more route speed funnels, and wherein at least two route speed funnels of the two or more route speed funnels have a common learned road sign.

10. A system for generating at least one route speed funnel for road work zone identification, the system comprising:
at least one non-transitory memory configured to store computer program code instructions; and
at least one processor configured to execute the computer program code instructions to:
generate a plurality of learned road signs from a plurality of road sign observations captured by a plurality of vehicles;
determine a plurality of primary speed funnels indicating an approach to or a leaving from a road work zone, each of the plurality of primary speed funnels comprising a different pair of learned road signs selected from the generated plurality of learned road signs, wherein the different pair of learned road signs indicate a change in sign values of speed limits;
generate the at least one route speed funnel from the plurality of primary speed funnels based on a route validity condition, wherein the route validity condition is based on one or more links between the different pair of learned road signs of each of the plurality of primary speed funnels, and wherein the at least one route speed funnel relates to a route that includes the road work zone.

11. The system of claim 10, wherein the at least one processor is further configured to process the plurality of road sign observations based on location data of the plurality of road sign observations to generate the plurality of learned road signs.

12. The system of claim 10, wherein the generated plurality of learned road signs are associated with corresponding locations, corresponding headings, corresponding road sign values, and corresponding road sign types.

13. The system of claim 12, wherein the at least one processor is further configured to:
determine a plurality of candidate speed funnels, based on the corresponding locations, the corresponding headings, the corresponding road sign values, and the corresponding road sign types of the plurality of learned road signs,
wherein each of the plurality of candidate speed funnels comprises a different pair of learned road signs selected from the generated plurality of learned road signs; and
determine the plurality of primary speed funnels by temporally validating the determined plurality of candidate speed funnels based on a correlation of corresponding timestamps of the plurality of road sign observations associated with the different pair of learned road signs in each of the determined plurality of candidate speed funnels.

14. The system of claim 13, wherein the at least one processor is further configured to:

calculate a plurality of distances between the corresponding locations of learned road signs of each pair of learned road signs in the generated plurality of learned road signs;
filter the generated plurality of learned road signs based on the calculated plurality of distances lying within a threshold distance range, to obtain a plurality of distance filtered learned road signs;
determine a plurality of heading filtered learned road signs from the plurality of distance filtered learned road signs based on a heading difference between each pair of the plurality of distance filtered learned road signs lying within a threshold heading range; and
obtain a plurality of sight filtered learned road signs by filtering the plurality of heading filtered learned road signs based on a heading of sight difference between each pair of the plurality of heading filtered learned road signs lying within a threshold sight range.

15. The system of claim 14, wherein the at least one processor is further configured to:
filter the plurality of sight filtered learned road signs based on a difference in the corresponding road sign values of each pair of the plurality of sight filtered learned road signs lying within a threshold value range, to obtain a plurality of value filtered learned road signs;
filter a plurality of pairs of value filtered learned road signs from the plurality of value filtered learned road signs based on the corresponding locations of value filtered learned road signs in each pair of the plurality of value filtered learned road signs; and
determine the plurality of candidate speed funnels based on the filtered plurality of pairs of value filtered learned road signs.

16. The system of claim 10, route validity condition comprises a total length of the one or more links lying within a threshold length and a heading difference between the one or more links lying within a threshold heading range.

17. The system of claim 10, wherein the generated at least one route speed funnel comprises two or more route speed funnels, and wherein at least two route speed funnels of the two or more route speed funnels have a common learned road sign.

18. The system of claim 17, wherein the at least one processor is further configured to merge the at least two route speed funnels of the two or more route speed funnels based on a position of the common learned road sign in each of the at least two route speed funnels of the two or more route speed funnels.

19. A computer program product comprising at least one non-transitory computer-readable storage medium having stored thereon computer-executable program code instructions which when executed by a computer, cause the computer to carry out operations for generating at least one route speed funnel for road work zone identification, the operations comprising:
generating a plurality of learned road signs from a plurality of road sign observations captured by a plurality of vehicles;
determining a plurality of primary speed funnels indicating an approach to or a leaving from a road work zone, each of the plurality of primary speed funnels comprising a different pair of learned road signs selected from the generated plurality of learned road signs, wherein the different pair of learned road signs indicate a change in sign values of speed limits;
generating the at least one route speed funnel from the plurality of primary speed funnels based on a route validity condition, wherein the route validity condition is based on one or more links between the different pair of learned road signs of each of the plurality of primary speed funnels, and wherein the at least one route speed funnel relates to a route that includes the road work zone.

20. The computer program product of claim 19, wherein the route validity condition comprises a total length of the one or more links lying within a threshold length and a heading difference between the one or more links lying within a threshold heading range.

* * * * *